(12) United States Patent
Otsuka

(10) Patent No.: US 10,471,492 B2
(45) Date of Patent: Nov. 12, 2019

(54) DIE-PRESSING DIE HAVING DUST COLLECTION PASSAGE AT PERIPHERAL EDGE PORTION OF ROLLER UNIT

(71) Applicant: AMADA HOLDINGS CO., LTD., Kanagawa (JP)

(72) Inventor: Yasuyuki Otsuka, Kanagawa (JP)

(73) Assignee: AMADA HOLDINGS CO., LTD., Kanagawa (JP)

( * ) Notice: Subject to any disclaimer, the term of this patent is extended or adjusted under 35 U.S.C. 154(b) by 0 days.

(21) Appl. No.: 16/320,765

(22) PCT Filed: Jul. 27, 2017

(86) PCT No.: PCT/JP2017/027177
§ 371 (c)(1),
(2) Date: Jan. 25, 2019

(87) PCT Pub. No.: WO2018/025736
PCT Pub. Date: Feb. 8, 2018

(65) Prior Publication Data
US 2019/0160508 A1  May 30, 2019

(30) Foreign Application Priority Data

Aug. 3, 2016 (JP) .................................. 2016-152852

(51) Int. Cl.
*B21D 28/00* (2006.01)
*B21D 22/06* (2006.01)
(Continued)

(52) U.S. Cl.
CPC ............. *B21D 22/06* (2013.01); *B21D 19/00* (2013.01); *B21D 22/02* (2013.01); *B21D 28/00* (2013.01);
(Continued)

(58) Field of Classification Search
CPC ........ B21D 22/06; B21D 37/00; B21D 22/02; B21D 28/02; B21D 28/00; B21D 19/00; B21D 28/36; B21D 45/06; B23Q 11/0046
(Continued)

(56) References Cited

U.S. PATENT DOCUMENTS 3,478,558 A * 11/1969 Miller .................. B21D 19/005
29/90.01
5,761,944 A 6/1998 Endo et al.
(Continued)

FOREIGN PATENT DOCUMENTS

| JP | 9-52129 | 2/1997 |
| JP | 2005-987 | 1/2005 |
| JP | 2006-95597 | 4/2006 |

OTHER PUBLICATIONS

Office Action issued in Japan Counterpart Patent Appl. No. 2016-152852, dated Nov. 24, 2017, along with an English translation thereof.
(Continued)

*Primary Examiner* — David B Jones
(74) *Attorney, Agent, or Firm* — Greenblum & Bernstein, P.L.C.

(57) ABSTRACT

A die-pressing die used for die-pressing a workpiece includes a die body on whose upper face a die hole is formed and on whose bottom face a discharge hole for discharging dusts of the workpiece is formed, and a roller unit disposed within the die hole and having a roller protruding upward from the upper face of the die body. A collection passage for collecting the dusts is formed at a peripheral edge portion of the die hole. One end of the collection passage is opened at the upper face of the die body, and another end thereof is opened to the discharge hole. The collection passage is configured to suction air due to a negative pressure state in the discharge hole.

8 Claims, 13 Drawing Sheets

(51) Int. Cl.
*B21D 28/02* (2006.01)
*B21D 19/00* (2006.01)
*B21D 22/02* (2006.01)
*B21D 28/36* (2006.01)
*B21D 37/00* (2006.01)
*B21D 45/06* (2006.01)
*B23Q 11/00* (2006.01)

(52) U.S. Cl.
CPC .............. *B21D 28/02* (2013.01); *B21D 28/36* (2013.01); *B21D 37/00* (2013.01); *B21D 45/06* (2013.01); *B23Q 11/0046* (2013.01)

(58) Field of Classification Search
USPC ............................................................ 72/39
See application file for complete search history.

(56) References Cited

U.S. PATENT DOCUMENTS

| | | | | |
|---|---|---|---|---|
| 6,796,156 B2 * | 9/2004 | Natalis | ................. | B21C 51/005 29/90.01 |
| 7,168,364 B2 * | 1/2007 | Schneider | ............ | B21C 51/005 101/26 |
| 8,042,369 B2 * | 10/2011 | Bytow | ................. | B21D 19/005 29/90.01 |
| 8,443,643 B2 * | 5/2013 | Endo | ................... | B21D 19/005 29/90.01 |
| 2006/0042341 A1 * | 3/2006 | Nishibu | ................. | B21D 19/00 72/335 |
| 2013/0312580 A1 | 11/2013 | Naito et al. | | |
| 2019/0160508 A1 * | 5/2019 | Otsuka | ................... | B21D 22/06 |
| 2019/0168276 A1 * | 6/2019 | Otsuka | ................... | B21D 28/34 |

OTHER PUBLICATIONS

Office Action issued in Japan Counterpart Patent Appl. No. 2016-152852, dated Sep. 29, 2017, along with an English translation thereof.

International Search Report issued by International Bureau of WIPO International Patent Application No. PCT/JP2017/027177, dated Oct. 10, 2017.

* cited by examiner

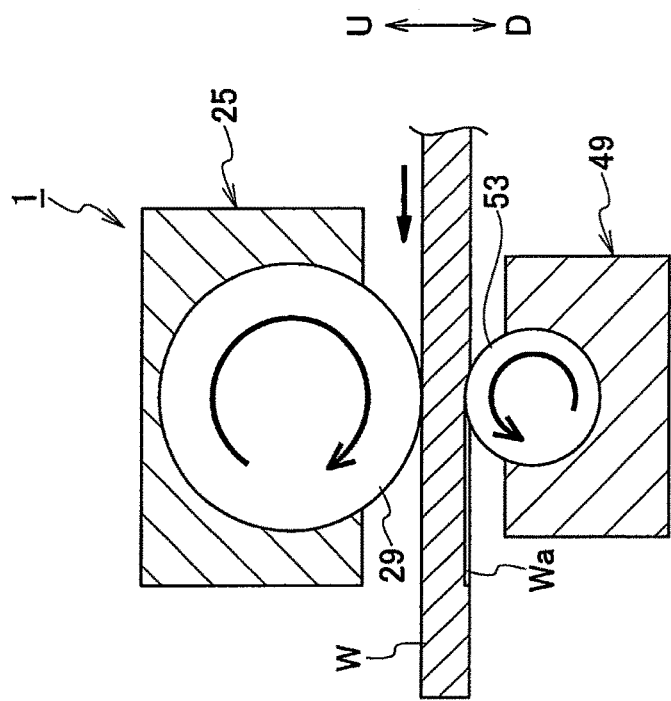
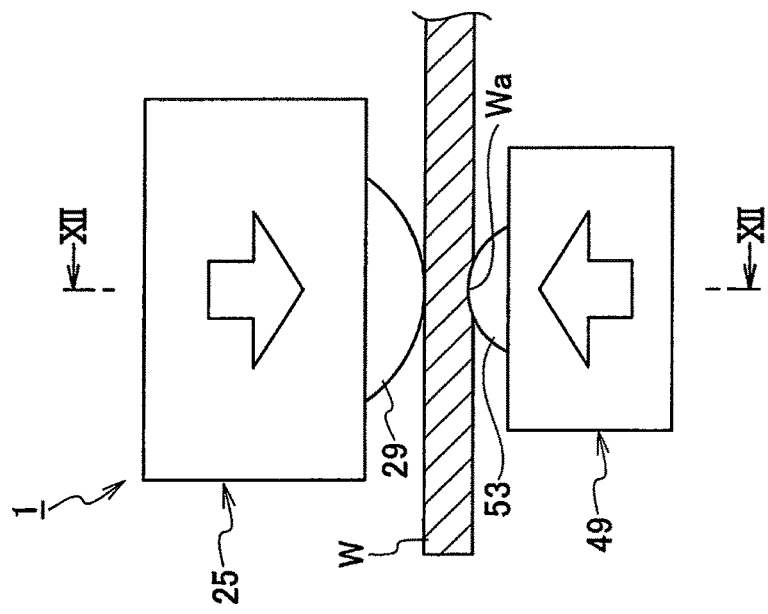
FIG.12 (a)
FIG.12 (b)

DIE-PRESSING DIE HAVING DUST COLLECTION PASSAGE AT PERIPHERAL EDGE PORTION OF ROLLER UNIT

TECHNICAL FIELD

The present invention relates to a die-pressing die used when carrying out die-pressing such as beveling or marking (engraving) to a workpiece.

BACKGROUND ART

Recently, various die-pressing dies and die-pressing punches are developed, and there is a Patent Document 1 as a prior art of die-pressing dies and die-pressing punches. Here, configurations of a die-pressing die and a die-pressing punch according to a prior art (conventional die-pressing die and die-pressing punch) are explained.

A conventional die-pressing punch includes a hollow cylindrical punch guide, and the punch guide is installed vertically movably (movably in a vertical direction) in an installation hole of an upper die holder member of an upper turret in a punch press. In addition, the punch guide includes a punch body (punch driver) movable vertically in its inside. Further, the punch body includes, at its upper end portion, a ring-shaped punch head integrally therewith, and the punch head is to be pressed (struck) from above by a striker in the punch press.

The punch guide includes an upper roller unit movable vertically beneath the punch body in its inside, and the upper roller unit includes a rotatable upper roller protruding downward from a bottom face of the punch guide. In addition, the punch guide includes, above the punch body in its inside, a spring urging the upper roller unit downward via the punch body.

The conventional die-pressing die includes a cylindrical die body installed in a lower die holder member such as a lower turret in the punch press, and a die hole is formed at a center portion of an upper face of the die body. In addition, the die body includes a lower roller unit within the die hole, and the lower roller unit has a rotatable lower roller protruding upward with respect to the upper face of the die body.

Therefore, a workpiece is located between the die-pressing punch and the die-pressing die by moving it in a horizontal direction. Then, by pressing the punch head from above by the striker to move the die-pressing punch (punch guide) downward, a worked portion of the workpiece is nipped by combination motions of the upper roller and the lower roller. Then, the workpiece is moved relatively to the die-pressing punch and the die-pressing die in the horizontal direction associating with the worked portion. In the other words, the die-pressing punch and the die-pressing die are moved relatively to the workpiece in the horizontal direction along the worked portion of the workpiece. By this, die-pressing such as beveling can be done to the workpiece.

PRIOR ART DOCUMENT

Patent Document

Patent Document 1: Japanese Patent Application Publication No. H9-52129

Here, dusts such as metal powders may stay at a periphery of the lower roller on the upper face of the die body. In such a case, there are following problems: a bottom face of the workpiece is scratched by the dusts, and rotation performance of the lower roller is inhibited due to entries of the dusts into the inside of the lower roller unit and thereby life of the lower roller unit is shortened.

SUMMARY OF INVENTION

In order to provide a die-pressing die that can solve the above problems and is configured by a new configuration, an object of the present invention is to provide a die-pressing die that can sufficiently prevent a bottom face of a workpiece from being scratched and can restrict dusts from entering into an inside of a lower free ball bearing.

Means for Solving Problems

According to an aspect of the present invention, provided is a die-pressing die used for die-pressing a workpiece, the die-pressing die comprising: a die body (die main body) on whose upper face a die hole is formed and on whose bottom face a discharge hole for discharging dusts is formed; and a roller unit (lower roller unit) disposed within the die hole and having a rotatable roller (lower roller) protruding upward from the upper face of the die body, wherein a collection passage for collecting the dusts is formed at a peripheral edge portion of the die hole, one end (inlet side) of the collection passage is opened at the upper face of the die body, another end (outlet side) of the collection passage is opened to the discharge hole, and the collection passage is configured to suction air due to a negative pressure state in the discharge hole.

It is preferable that a circumferential groove is formed on an outer circumferential surface of the die body, a supply passage for supplying air into an inside of the die body is formed, one end of the supply passage is opened to the circumferential groove, another end of the supply passage is opened to the discharge hole, and an inside of the discharge hole is configured to be turned into the negative pressure state when air is supplied to the supply passage.

It is preferable that a depressed storage portion for storing the dusts is formed at the peripheral edge portion of the die hole on the upper face of the die body.

It is preferable that the roller unit is detachable with respect to the die body.

It is preferable that the collection passage faces to part of an outer circumferential surface of the roller unit from an upper end thereof to a lower end thereof.

It is preferable that the roller is a ball roller, and the roller unit is a free ball bearing.

According to the aspect of the present invention, during die-pressing of the workpiece, the collection passage suctions air by turning the inside of the discharge hole into the negative pressure state (depressurized state). Then, the dusts such as metal powders attaching to the upper face of the die body are sent to a side of the discharge hole through the collection passage and thereby discharged from the discharge hole to the outside. Therefore, it becomes possible to sufficiently restrict the dusts from staying around the roller unit on the upper face of the die body during die-pressing of the workpiece.

According to the present invention, it becomes possible to sufficiently prevent a bottom face of the workpiece from being scratched by the dusts and to prolong life of the roller unit by restricting the dusts from entering into the inside of the roller unit.

BRIEF DESCRIPTION OF DRAWINGS

FIG. 12(a) is a schematic cross-sectional view explaining actions with respect to marking with the die-pressing die set according to the embodiment of the present invention, and FIG. 12(b) is a schematic cross-sectional view taken along a line XII-XII in FIG. 12(a).

DESCRIPTION OF EMBODIMENTS

An embodiment and another embodiment according to the present invention will be described with reference to the drawings.

Note that an "axial center" indicates an axial center of a die-pressing punch or die-pressing die, and, in other words, indicates an axial center of a punch guide, a punch body or a die body.

Embodiment According to the Present Invention

Figure 1:
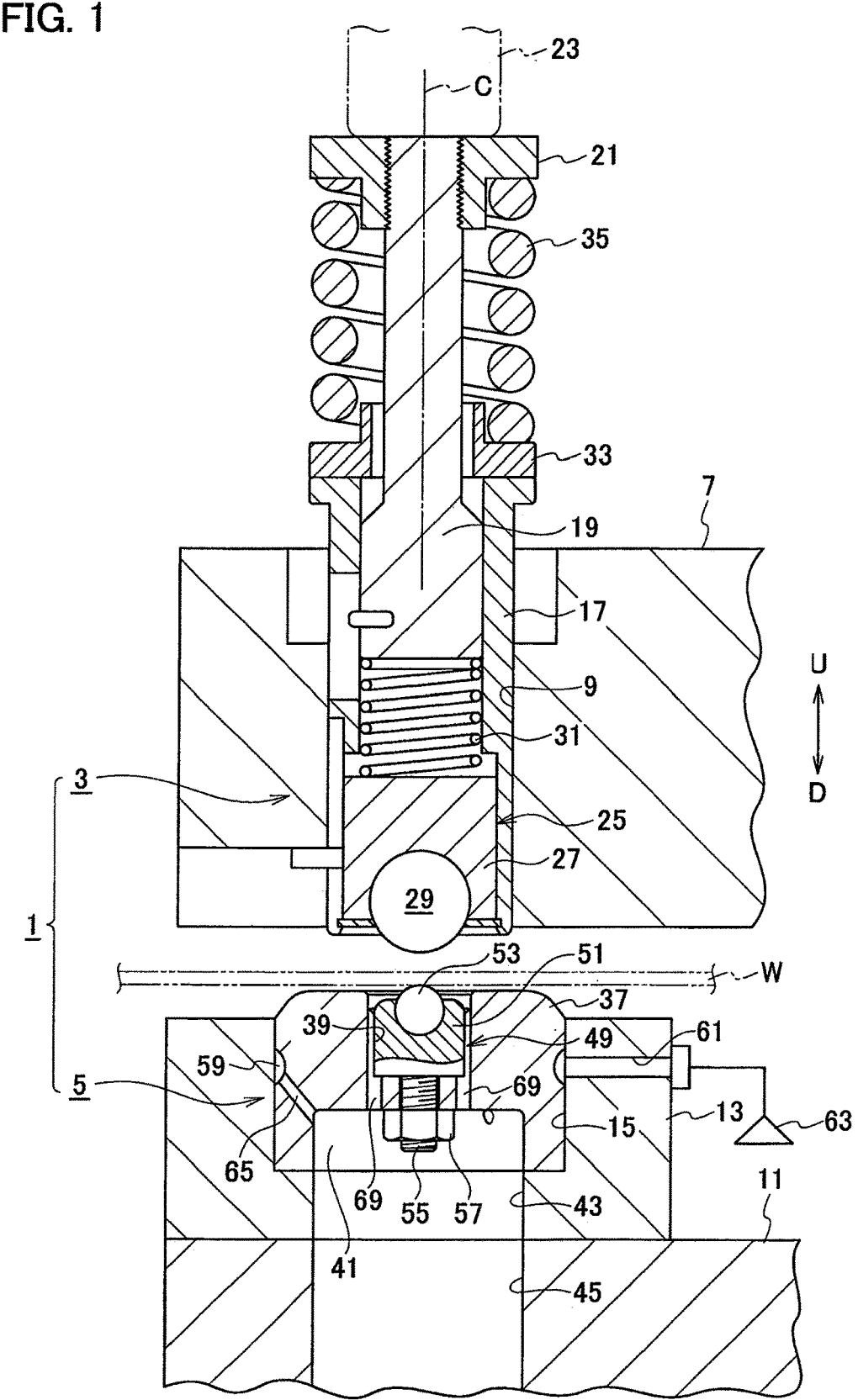
FIG. 1 is a cross-sectional view showing a die-pressing die set (including its surroundings) according to an embodiment of the present invention.
Figure 2:
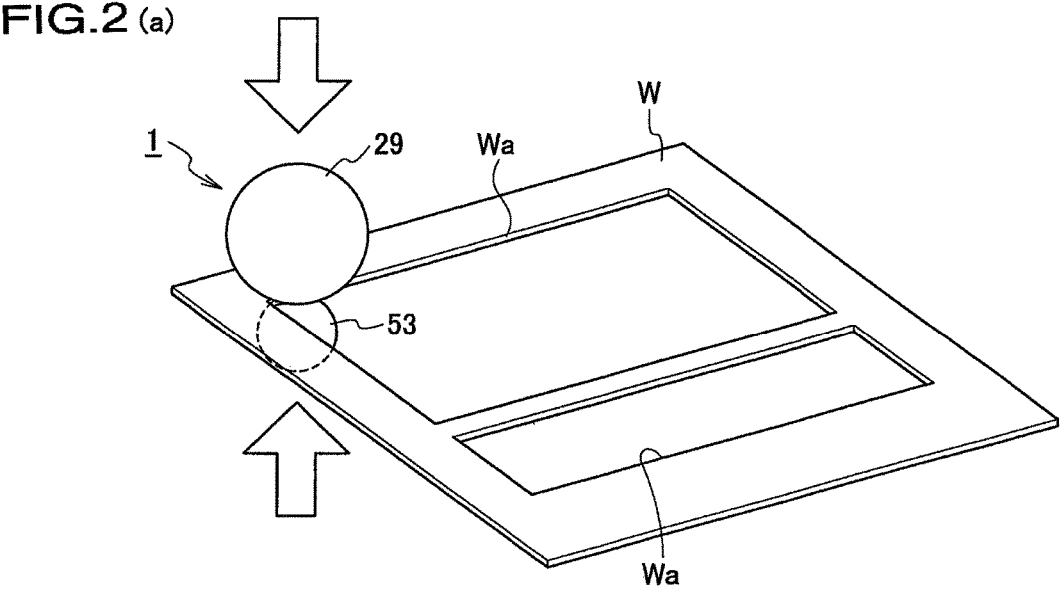
FIG. 2(a) is a schematic perspective view showing a state where beveling is done with the die-pressing die set according to the embodiment of the present invention.
FIG. 2(b) is a state where marking is done with the die-pressing die set according to the embodiment of the present invention.
Figure 2:
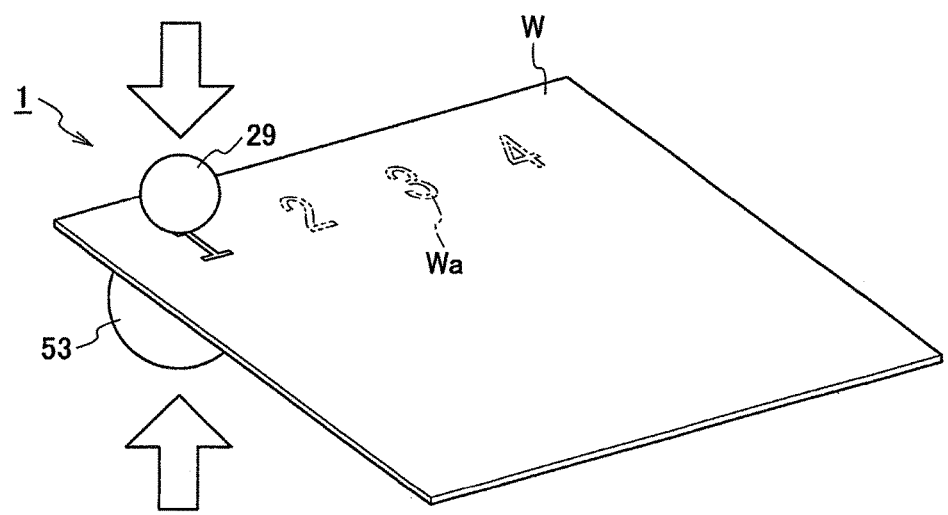

As shown in FIG. 1 and FIGS. 2(a) and (b), a die-pressing die set 1 according to an embodiment of the present invention is used for carrying out die-pressing such as beveling and marking on a plate-shaped workpiece W, and configured of a die-pressing punch 3 and a die-pressing die 5. In addition, the die-pressing punch 3 is held detachably in an installation hole 9 of an upper turret 7, which serves as an upper hold base in a punch press. The die-pressing die 5 is held detachably in an installation hole 15 of a die holder 13 attached to a lower turret 11, which serves as a lower hold base in the punch press.

Next, configurations of the die-pressing punch 3 according to the embodiment of the present invention will be explained.

Figure 3:
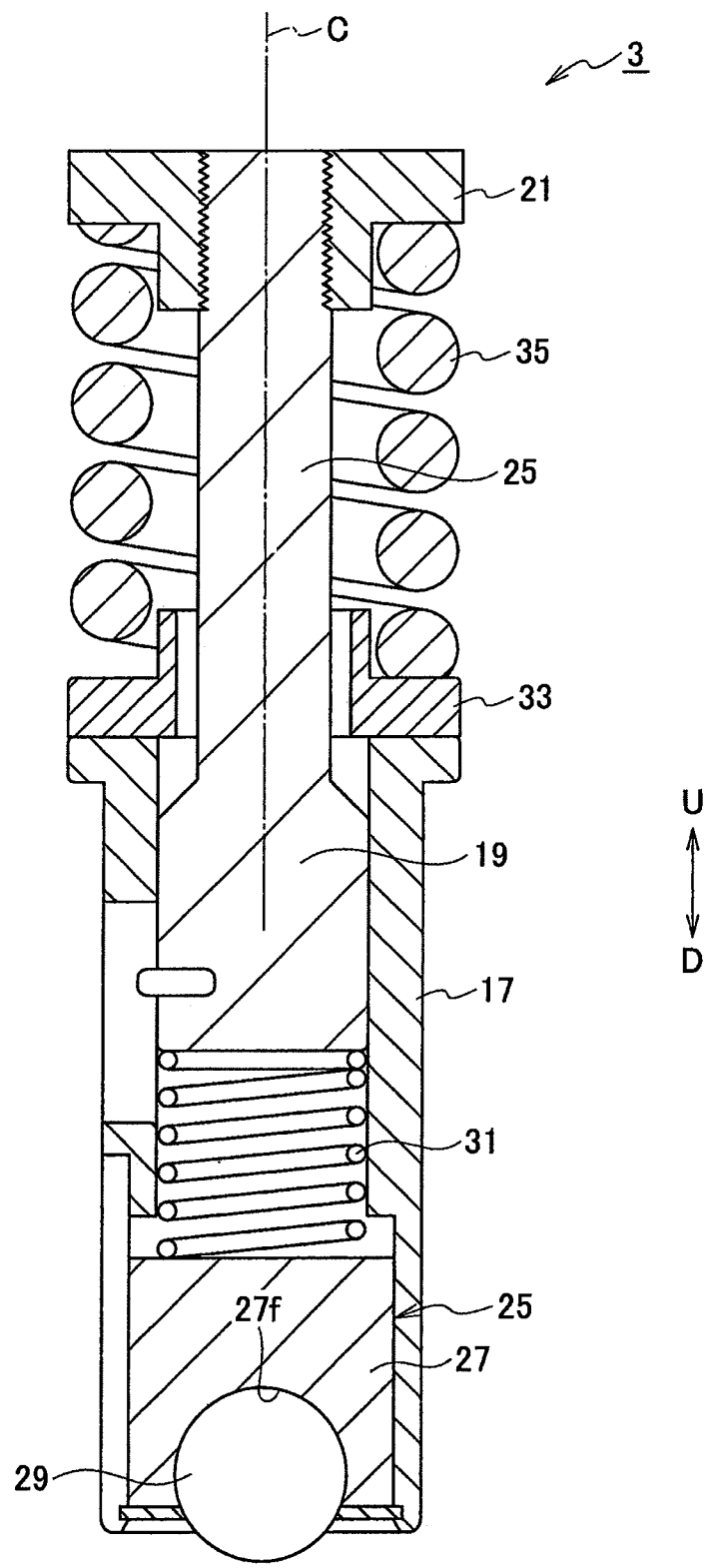
FIG. 3 is a cross-sectional view showing a die-pressing punch according to the embodiment of the present invention.
Figure 4:
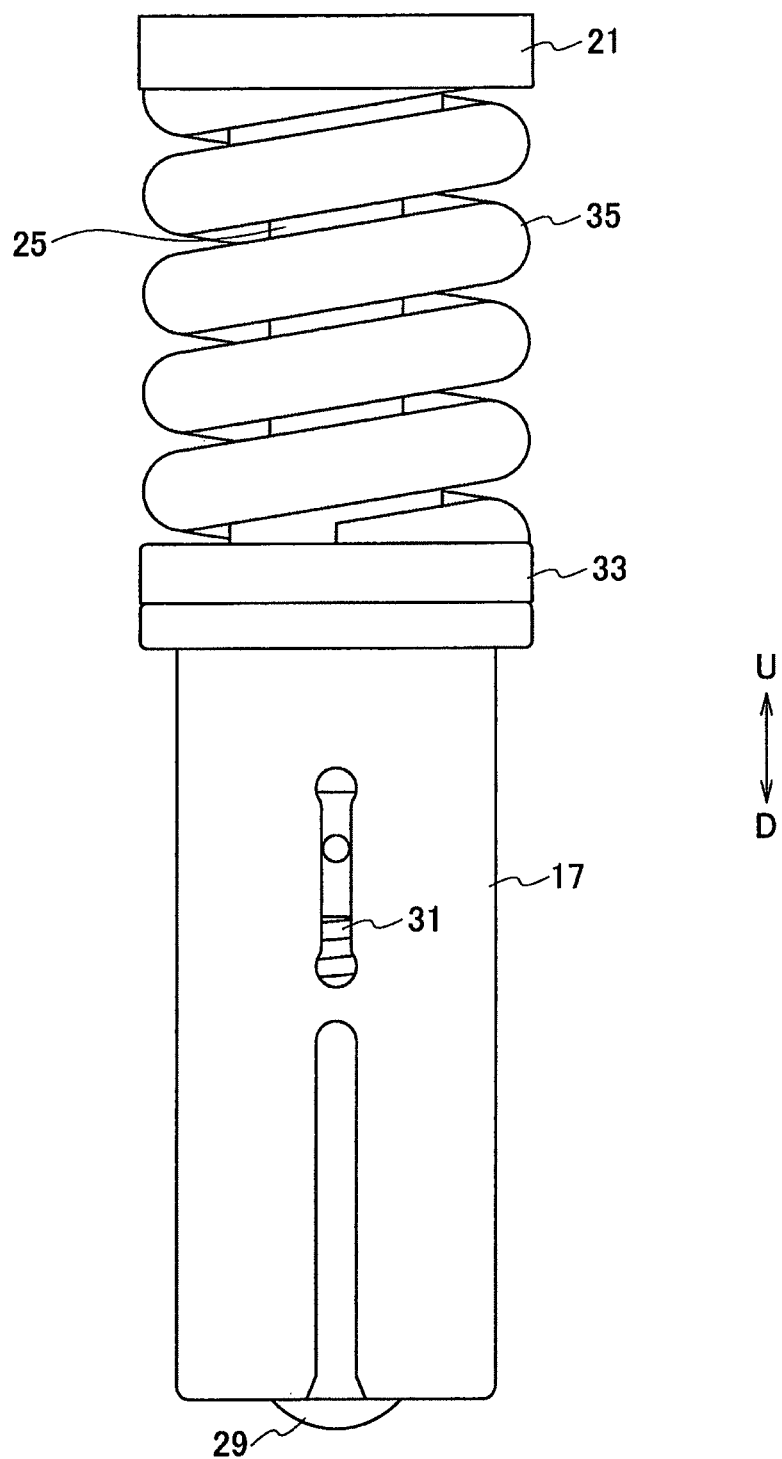
FIG. 4 is a side view showing the die-pressing punch according to the embodiment of the present invention.
Figure 5:
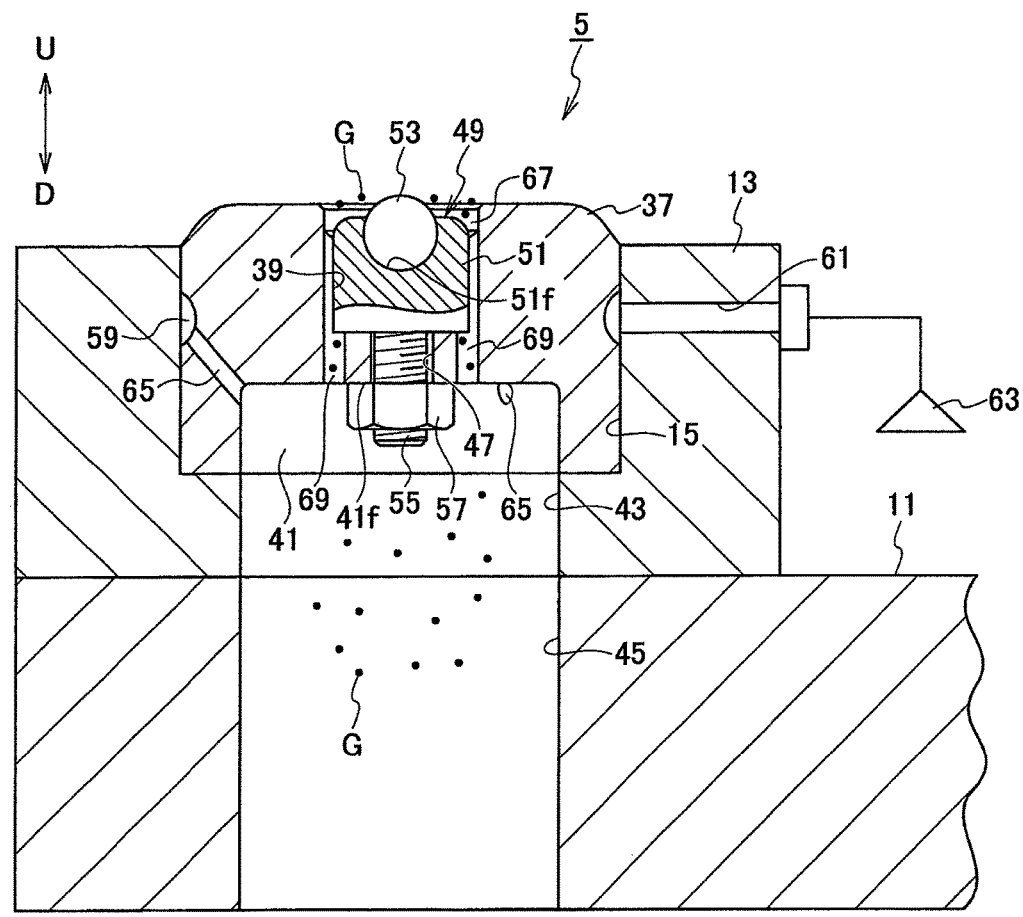
FIG. 5 is a cross-sectional view showing a die-pressing die (including its surroundings) according to the embodiment of the present invention.
Figure 6:
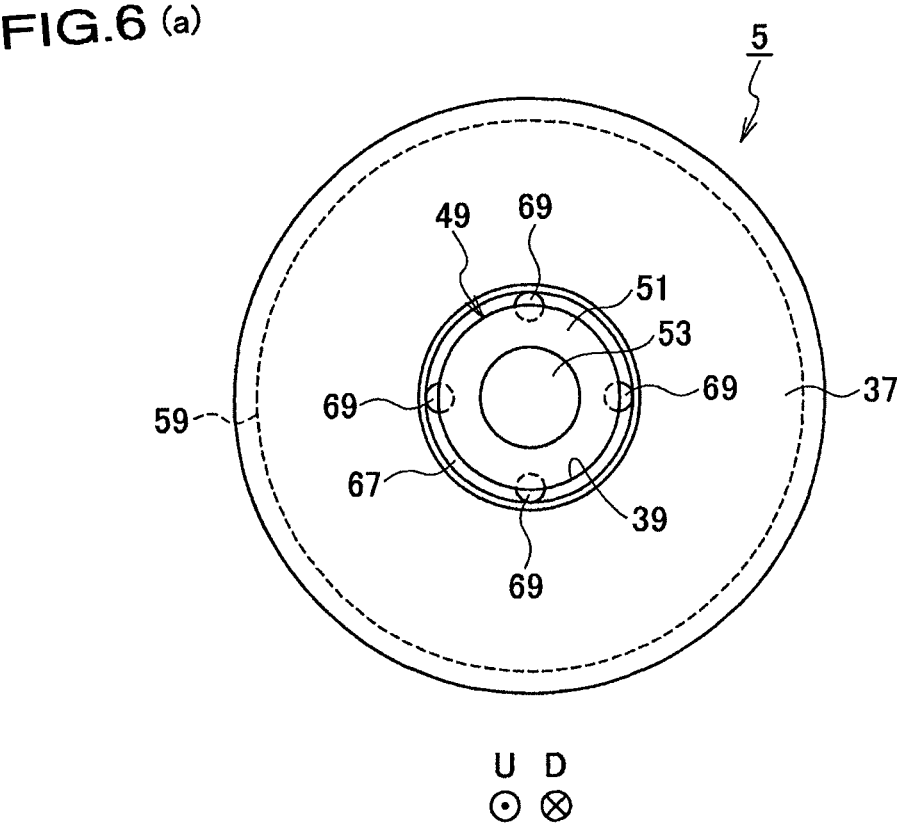
FIG. 6(a) is a plan view showing the die-pressing die according to the embodiment of the present invention.
FIG. 6(b) is a cross-sectional view showing the die-pressing die according to the embodiment of the present invention.
Figure 6:
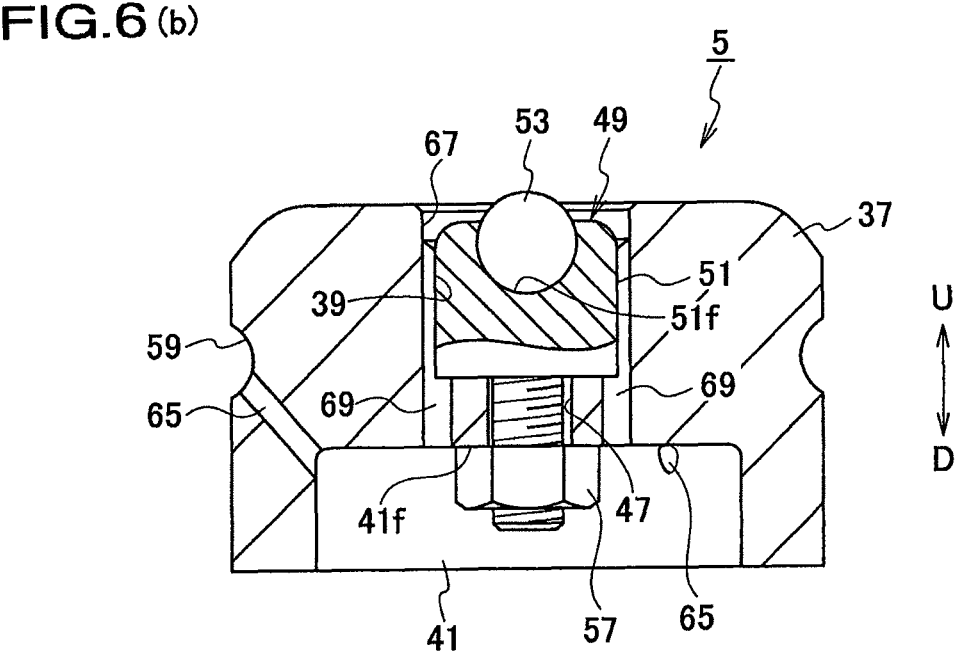
Figure 7:
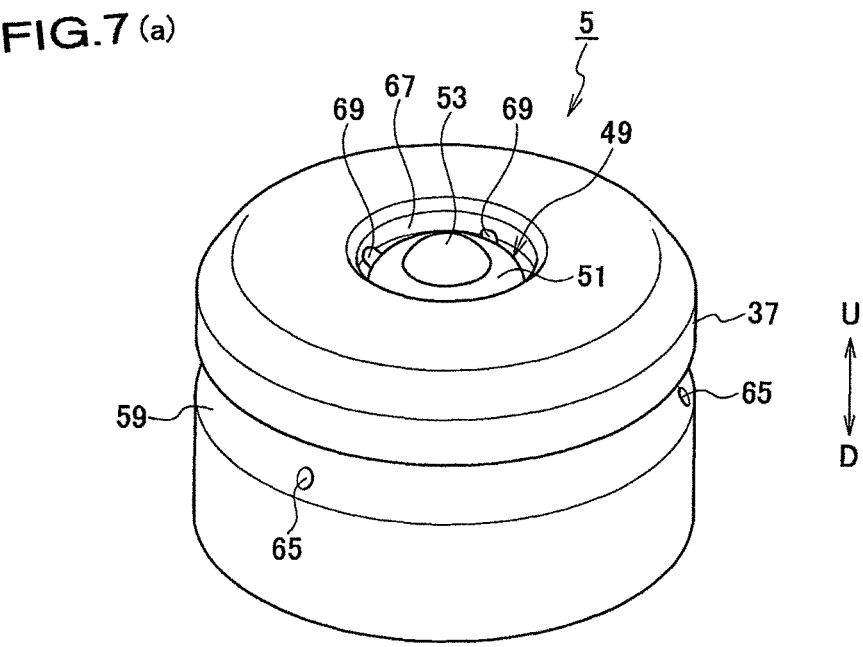
FIG. 7(a) is a perspective view showing the die-pressing die according to the embodiment of the present invention.
FIG. 7(b) is a bottom view showing the die-pressing die according to the embodiment of the present invention.
Figure 7:
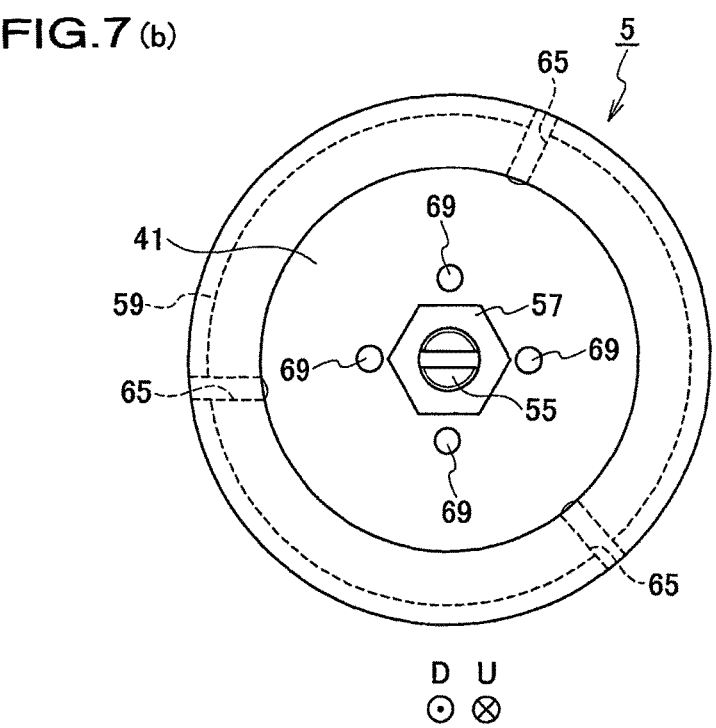

As shown in FIG. 1, FIG. 3 and FIG. 4, the die-pressing punch 3 includes a hollow cylindrical punch guide 17, and the punch guide 17 is held in the installation hole 9 of the upper turret 7 vertically movably (movably in a vertical direction) and detachably. The punch guide 17 is supported by plural lifter springs (not shown in the drawings) attached along a circumferential edge of the installation hole 9 of the upper turret 7. In addition, the punch guide 17 is configured so as not to be rotatable about an axial center C with respect to the installation hole 9 of the upper turret 7.

The punch guide 17 includes a vertically movable punch body 19 in its inside, and the punch body 19 is configured so as not to be rotatable about the axial center (axial center of the punch guide 17) C. In addition, the punch body 19 includes a ring-shaped punch head 21 screw-fitted therewith at its upper end portion, and the punch head 21 is to be pressed (struck) from above by a striker 23 in the punch press.

The punch guide 17 includes a vertically movable upper free ball bearing 25, which serves as an upper roller unit, beneath (on a lower side of) the punch body 19 in its inside. The upper free ball bearing 25 is not removable from the bunch guide 17. In addition, the upper free ball bearing 25 includes a unit main body 27 provided vertically movably in the inside of the punch guide 17, and the unit main body 27 has a support surface 27f depressed hemispherically at its lower portion. Further, the upper free ball bearing 25 has an upper ball roller (upper roller having a spherical shape) 29 provided rotatably on the support surface 27f of the unit main body 27 via plural small balls (not shown in the drawings). The upper ball roller 29 protrudes downward from a bottom face of the punch guide 17.

The punch guide 17 includes a coil spring 31 urging the upper free ball bearing 25 downward, between the punch body 19 and the upper free ball bearing 25 in its inside. In addition, the punch body 19 includes a ring-shaped spring seat 33 on an upper side of the punch guide 17 on a side of its outer circumferential surface. Further, the punch body 19 includes, between the punch head 21 and the spring seat 33 on a side of its outer circumferential surface, a stripper spring 35 for keeping a distance, in the vertical direction, between the punch head 21 and the punch guide 17 at a given distance.

Next, configurations of the die-pressing die 5 according to the embodiment of the present embodiment will be explained.

As shown in FIG. 1 and FIG. 5 to FIG. 7, the die-pressing die 5 includes a cylindrical die body (die main body) 37, and the die body 37 is held detachably in the installation hole 15 of the die holder 13. In addition, a die hole 39 is formed at a center portion of an upper surface of the die body 37. A discharge hole 41 for discharging dusts G such as iron powders (one type of metal powders) to the outside is formed at a center portion of a bottom face of the die body 37. The discharge hole 41 communicates with each of a bottom hole 43 formed on a bottom of the installation hole 15 of the die holder 13 and a penetrating hole 45 formed in the lower turret 11. In other words, the discharge hole 41 communicates with the outside through the bottom hole 43 of the die holder 13 and the penetrating hole 45 of the lower turret 11. Further, a through hole 47 is formed between the die hole 39 and the discharge hole 41 in the die body 37.

The die body 37 includes a lower free ball bearing 49, which serves as a lower roller unit, within the die hole 39. In addition, the lower free ball bearing 49 has a unit main body 51 provided inside the die hole 39 of the die body 37, and the unit main body 51 has a support surface 51f depressed hemispherically at its upper portion. Further, the lower free ball bearing 49 has a lower ball roller (lower roller having a spherical shape) 53 provided rotatably on the support surface 51f of the unit main body 51 via plural small balls (not shown in the drawings). The lower ball roller 53 protrudes upward from an upper face of the die body 37.

The lower free ball bearing 49 is detachable with respect to the die body 37 by an attachment screw 55 and an attachment nut 57. The attachment screw 55 is inserted through the through hole 47, and a base end portion (an upper end portion) of the attachment screw 55 is integrally jointed with the unit main body 51. The attachment nut 57 is fastened to a free end portion (a lower end portion) of the attachment screw 55, and is contacted and pressed onto (contacts in a state of applying pressure with) a ceiling face 41f of the discharge hole 41.

Here, the lower free ball bearing 49 smaller-sized than the upper free ball bearing 25 is shown as an example in FIG. 1, but the lower free ball bearing 49 identical-sized to the upper free ball bearing 25 or larger-sized than the upper free ball bearing 25 may be used. In other words, the lower ball roller 53 having a smaller diameter than that of the upper ball roller 29 is shown as an example in FIG. 1, but the lower ball roller 53 having an identical diameter to that of the upper ball roller 29 or a larger diameter than that of the upper ball roller 29 may be used.

As shown in FIG. 1 and FIG. 5 to FIGS. 7(a) and (b), a circumferential groove 59 is formed on an outer circumferential surface of the die body 37. The circumferential groove 59 communicates with a communication passage 61 formed in the die holder 13 when the die body 37 is installed in the installation hole 15 of the die holder 13. In addition, the circumferential groove 59 is connectable to an air supply source 63 such as an air compressor or a fan via the communication passage 61.

Plural supply passages 65 for supplying high-pressure air are formed at intervals in a circumferential direction on a side of an outer circumferential surface in the die body 37. Each one end (inlet side) of the supply passages 65 is opened to the circumferential groove 59, and each another end (outlet side) of the supply passages 65 is opened to the discharge hole 41. Each of the supply passages 65 can be communicated with the communication passage 61 via the circumferential groove 59 when the die body 37 is installed in the installation hole 15 of the die holder 13. Then, the inside of the discharge hole 41 is turned into a negative pressure state (depressurized state) when the high-pressure air is supplied to the plural supply passages 65 from the air supply source 63 through the communication passage 61 and so on.

A ring-shaped depressed storage portion 67 for temporarily storing dusts G (see FIG. 5) is formed at a peripheral edge portion of the die hole 39 on the upper face of the die body 37. Note that, instead of forming the ring-shaped depressed storage portion 67 at the peripheral edge portion of the die hole 39 on the upper face of the die body 37, plural depressed storage portions (not shown in the drawings) for temporarily storing the dusts G may be formed at intervals in a circumferential direction.

Plural collection passages 69 for collecting the dusts G are formed at intervals in a circumferential direction at a peripheral edge portion of the lower free ball bearing 49 in the die body 37, and each of the collection passages 69 extends in the vertical direction. Each one end (inlet side) of the collection passages 69 is opened to the depressed storage portion 67, i.e. opened at the upper face of the die body 37. Each another end (outlet side) of the collection passages 69 is opened to the discharge hole 41. Each of the collection passages 69 faces (is opposite) to part of an outer circumferential surface of the unit main body 51 (an outer circumferential surface of the lower free ball bearing 49) from its upper end to its lower end. Further, each of the collection passages 69 is configured to suction air due to the negative pressure state (depressurized state) in the discharge hole 41.

Figure 8:
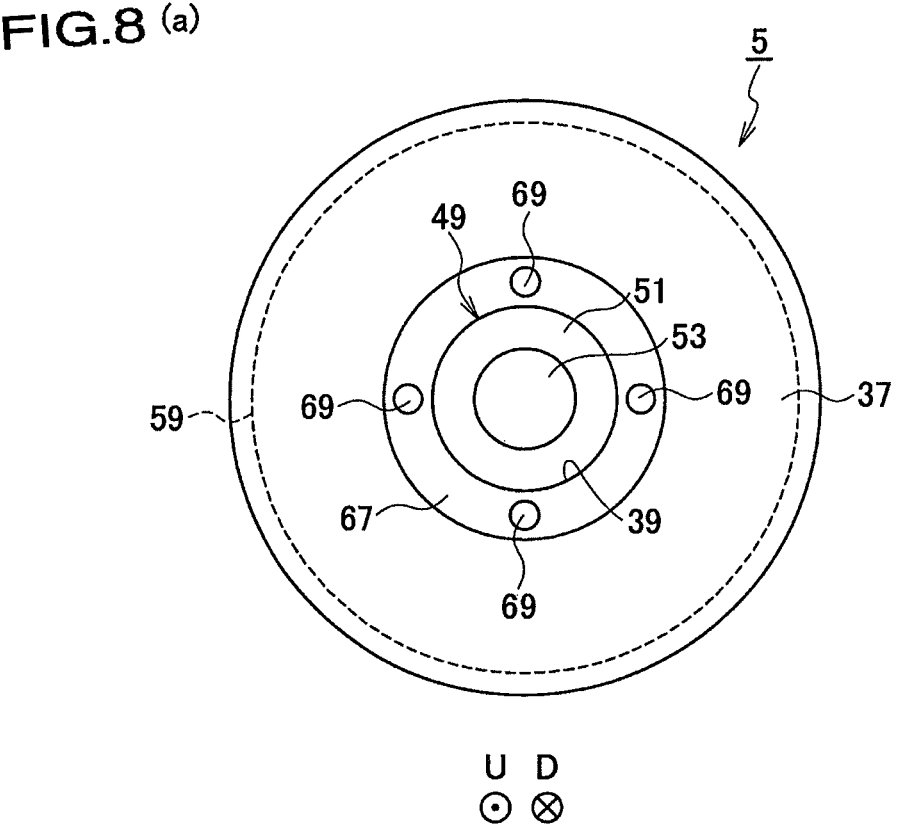
FIG. 8(a) is a plan view showing a die-pressing die according to a modified example of the embodiment of the present invention.
FIG. 8(b) is a cross-sectional view showing the die-pressing die according to the modified example of the embodiment of the present invention.
Figure 8:
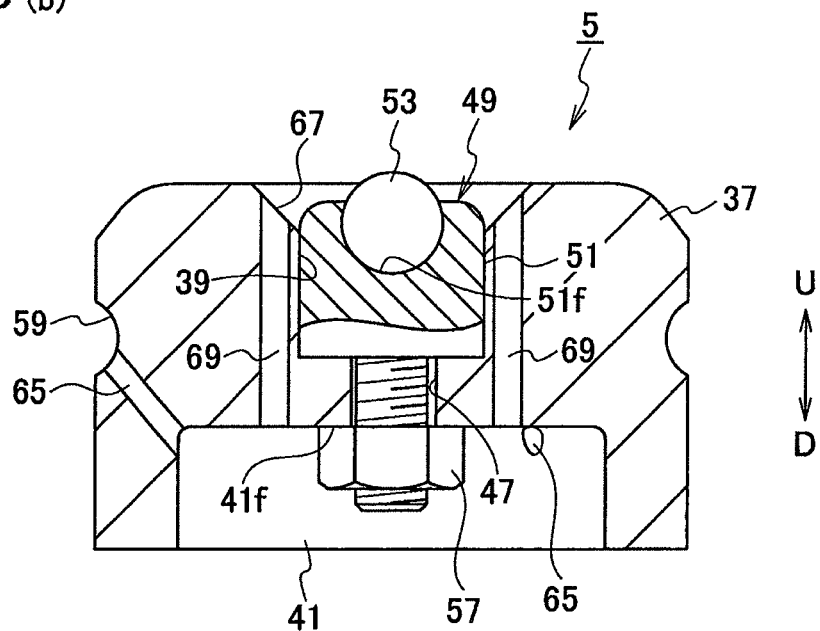

Note that, as shown in FIGS. 8(a) and (b), a cross-sectional shape of the depressed storage portion 67 may be formed in a tapered manner. In addition, each of the collection passages 69 may not face to part of the outer circumferential surface of the unit main body 51 from its upper end to its lower end.

Next, actions of the embodiment according to the present invention will be explained.

Actions with Respect to Beveling

Figure 9:
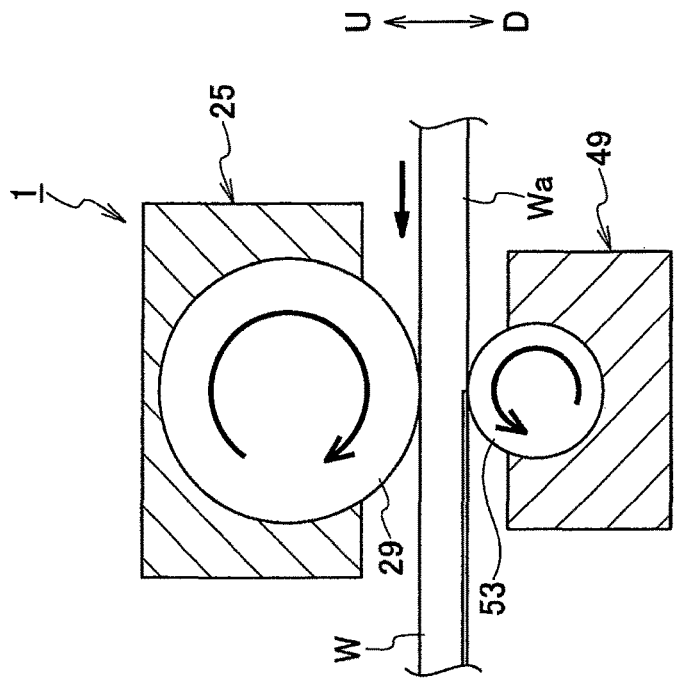
FIG. 9(a) is a schematic cross-sectional view explaining actions with respect to beveling with the die-pressing die set according to the embodiment of the present invention.
FIG. 9(b) is a schematic cross-sectional view taken along a line IX-IX in FIG. 9(a).
Figure 9:
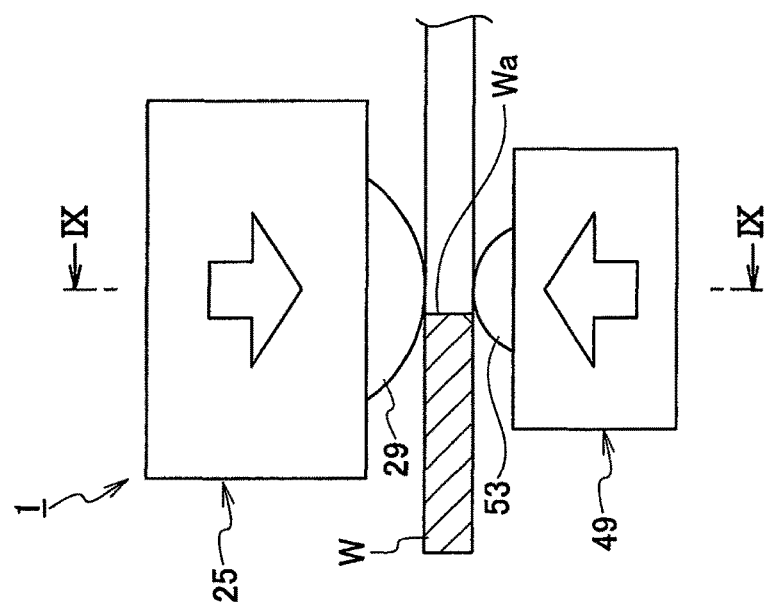

As shown in FIG. 1, FIG. 2(a) and FIGS. 9(a) and (b), a workpiece W is located between the die-pressing punch 3 and the die-pressing die 5 by moving it in the horizontal direction by use of the pie-pressing die set 1 in which a diameter of the lower ball roller 53 is made smaller than that of the upper ball roller 29. Subsequently, the die-pressing punch 3 (the punch guide 17) is moved downward against urging forces of the plural lifter springs by pressing the punch head 21 from above by the striker 23. Then, an end edge Wa that is a worked portion Wa of the workpiece W can be nipped by combination motions of the upper ball roller 29 and the lower ball roller 53. At this moment, apex points of the upper ball roller 29 and the lower ball roller 53 are slightly offset (e.g. 0.5 mm) with respect to the end edge Wa of the workpiece W.

After that, the workpiece W is moved relatively to the die-pressing die set 1 in the horizontal direction associating with the end edge (worked portion) Wa. In other words, the die-pressing die set 1 is moved relatively to the workpiece W in the horizontal direction along the end edge Wa of the workpiece W. By this, beveling can be done on a bottom-face side of the end edge Wa of the workpiece W.

Figure 10A:
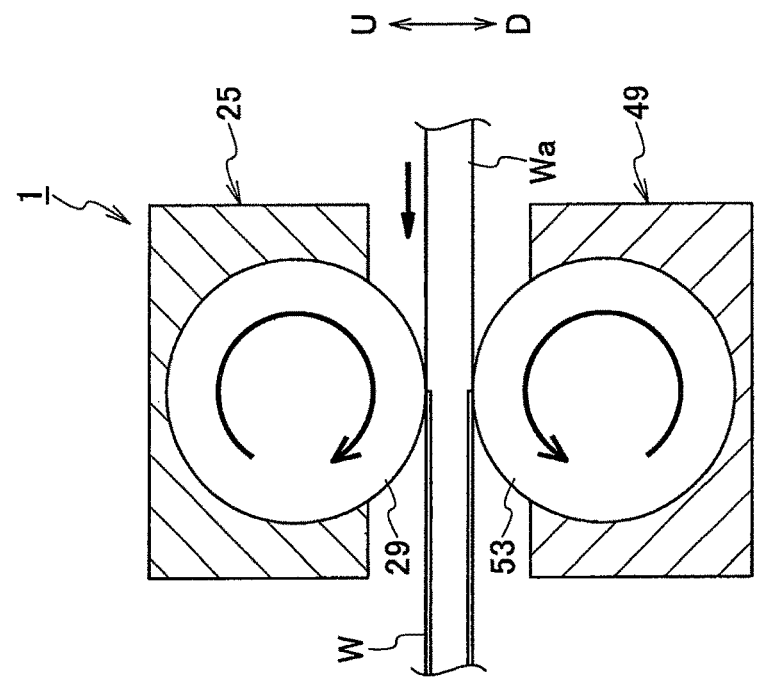
FIG. 10(a) is a schematic cross-sectional view explaining actions with respect to beveling with the die-pressing die set according to the embodiment of the present invention.
Figure 10B:
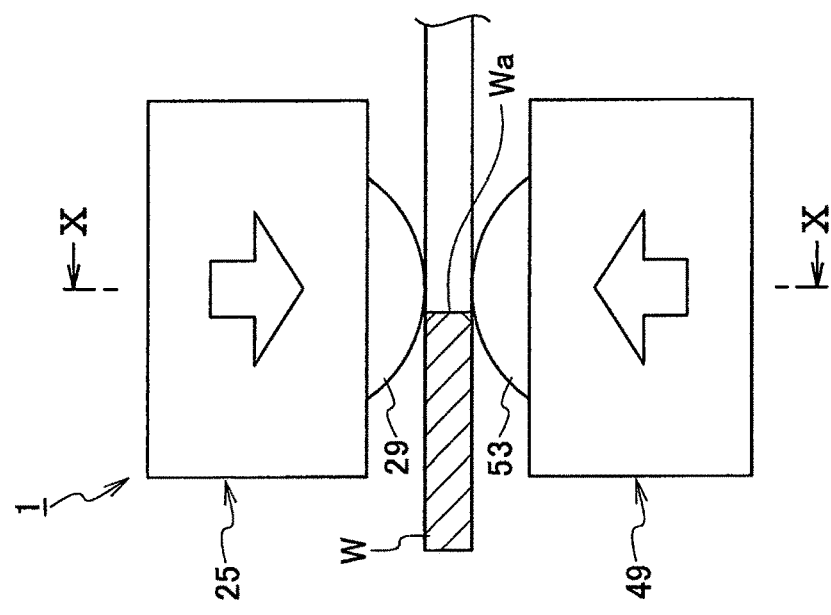
FIG. 10(b) is a schematic cross-sectional view taken along a line X-X in FIG. 10(a).

In a case of carrying out beveling on both-face sides (an upper-face side and the bottom-face side) of the end edge Wa of the workpiece W, actions equivalent to the above actions are done by use of the die-pressing die set 1 in which a diameter of the lower ball roller 53 is made equal to that of the upper ball roller 29 as shown in FIGS. 10(a) and (b).

Actions with Respect to Marking

Figure 11:
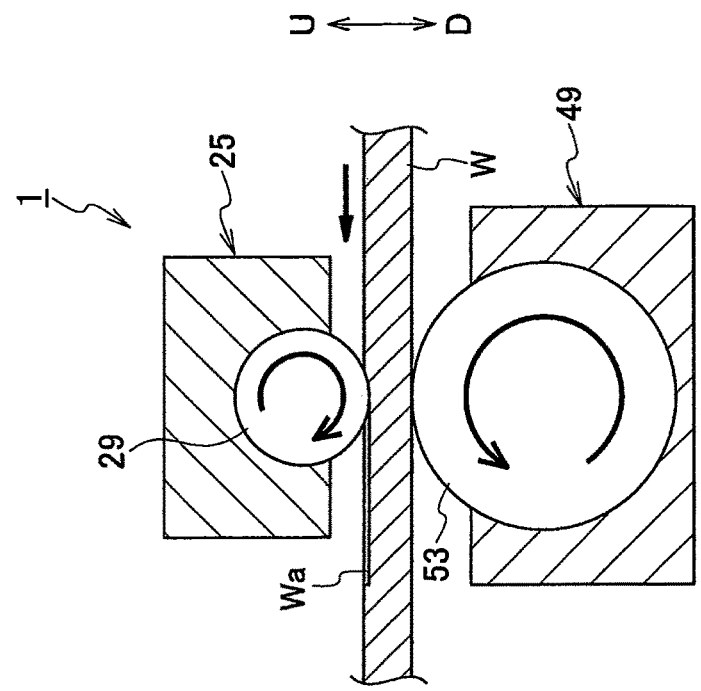
FIG. 11(a) is a schematic cross-sectional view explaining actions with respect to marking with the die-pressing die set according to the embodiment of the present invention.
FIG. 11(b) is a schematic cross-sectional view taken along a line XI-XI in FIG. 11(a).
Figure 11:
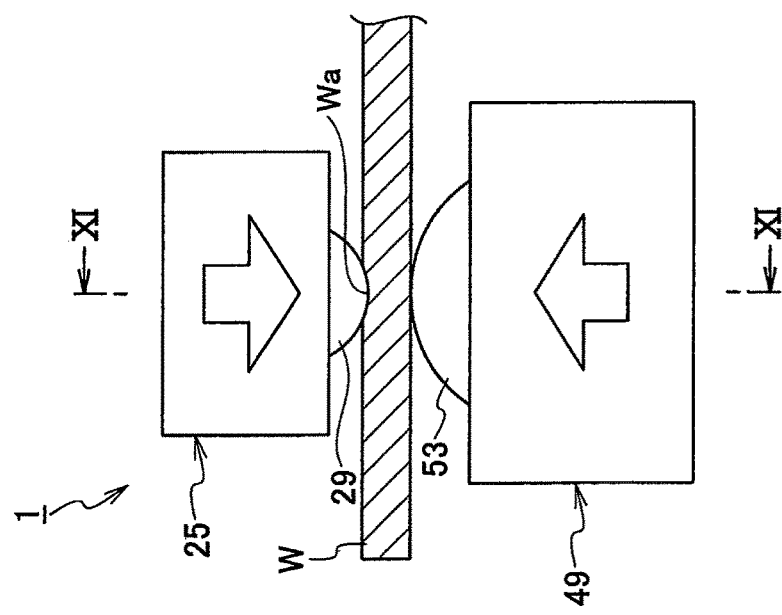

As shown in FIG. 1, FIG. 2(b) and FIGS. 11(a) and (b), a workpiece W is located between the die-pressing punch 3 and the die-pressing die 5 by moving it in the horizontal direction by use of the pie-pressing die set 1 in which a diameter of the lower ball roller 53 is made larger than that of the upper ball roller 29. Subsequently, the die-pressing punch 3 (the punch guide 17) is moved downward against urging forces of the plural lifter springs by pressing the punch head 21 from above by the striker 23. Then, a worked portion Wa of the workpiece W can be nipped by combination motions of the upper ball roller 29 and the lower ball roller 53.

After that, the workpiece W is moved relatively to the die-pressing die set 1 in the horizontal direction associating with the worked portion Wa. In other words, the die-pressing die set 1 is moved relatively to the workpiece W in the horizontal direction along the worked portion Wa of the workpiece W. By this, marking (engraving) can be done on an upper-face side of the worked portion Wa of the workpiece W.

In a case of carrying out marking on a bottom-face side of the worked portion Wa of the workpiece W, actions equivalent to the above actions are done by use of a die-pressing die set 1 in which a diameter of the lower ball roller 53 is made smaller than that of the upper ball roller 29 as shown in FIGS. 12(a) and (b).

Specific Actions of the Die-Pressing Die 5

During die-pressing such as beveling of the workpiece W, the plural collection passages 69 suction air with the negative pressure state in the discharge hole 41 brought by driving the air supply source 63 to supply high-pressure air to each of the plural supply passages 65 through the communication passage 61 and the circumferential groove 59. Then, the dusts G such as iron powders attaching to the upper face of the die body 37 are sent to a side of the discharge hole 41 through the plural collection passages 69 and thereby discharged from the discharge hole 41 to the outside through the bottom hole 43 of the die holder 13 and the penetrating hole 45 of the lower turret 11. By this, it becomes possible to sufficiently restrict the dusts G from staying around the lower free ball bearing 49 on the upper face of the die body 37. Especially, since each of the collection passages 69 faces to part of the outer circumferential surface of the unit main body 51 from its upper end to its lower end, collectivity of the dusts G is improved and thereby it becomes possible to sufficiently restrict the dusts G from staying around the lower free ball bearing 49.

On the other hand, dusts G that are not discharged from the discharge hole 41 to the outside are temporarily stored in the depressed storage portion 67. By this, it becomes possible to sufficiently restrict the dusts G from dispersing during die-pressing of the workpiece W.

As explained above, according to the embodiment of the present invention, it becomes possible to sufficiently restrict the dusts G from staying around the lower free ball bearing 49 on the upper face of the die body 37 while sufficiently restricting the dusts G from dispersing during die-pressing of the workpiece W. Therefore, it becomes possible to sufficiently prevent the bottom face of the workpiece W from being scratched by the dusts G, and to prolong life of the lower free ball bearing 49 by restricting the dusts G from entering into the inside of the lower free ball bearing 49.

In addition, as explained above, the lower free ball bearing 49 is detachable with respect to the die body 37. Therefore, according to the present embodiment, it becomes possible to prolong life of an entire of the die-pressing die 5 by replacing the lower free ball bearing 49 in a case where rotation performance of the lower ball roller 53 degrades.

Another Embodiment According to the Present Invention

Figure 13:
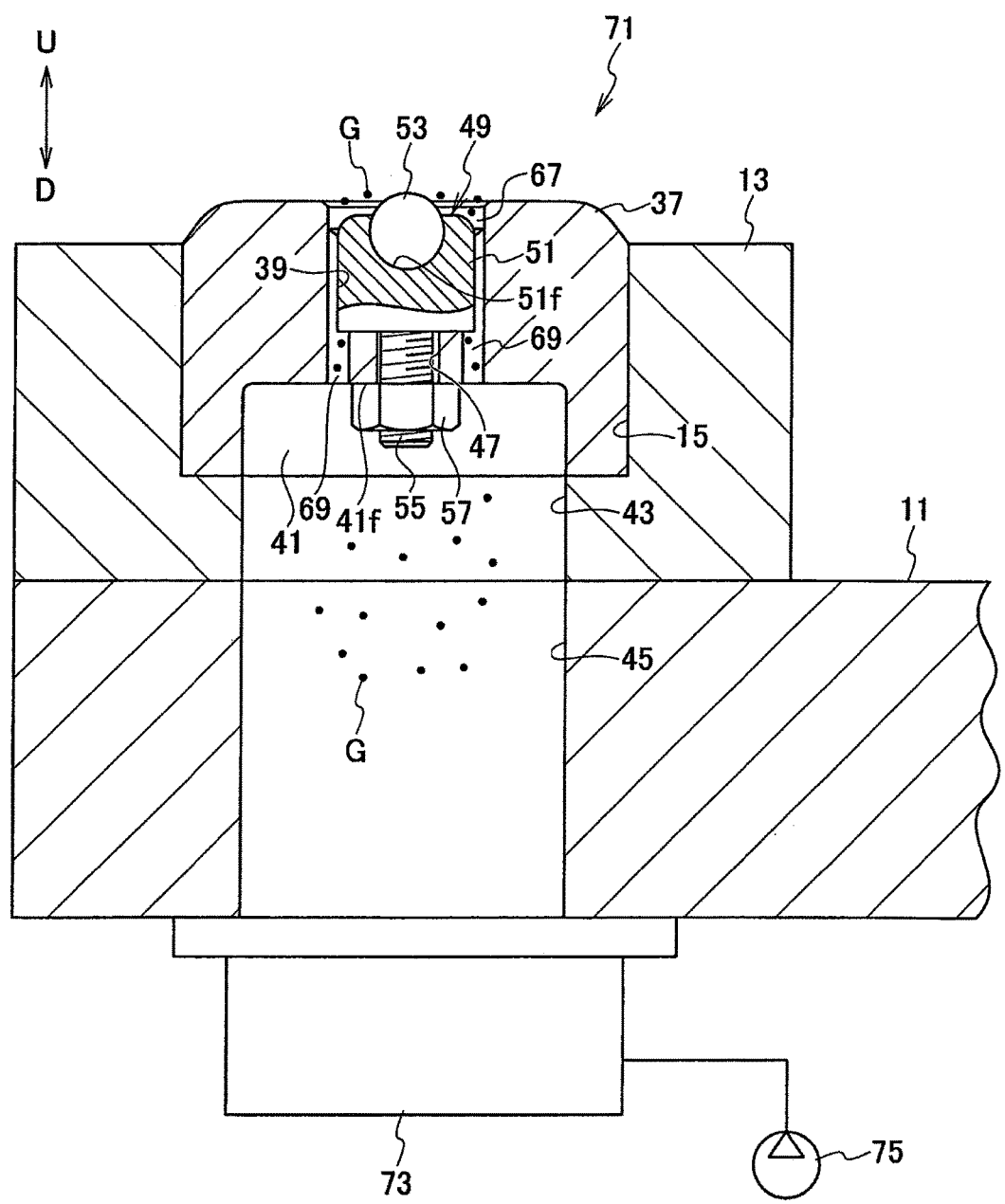
FIG. 13 is a cross-sectional view showing a die-pressing die (including its surroundings) according to another embodiment of the present invention.

In another embodiment according to the present invention, a die-pressing die 71 as shown in FIG. 13 is used, instead of the die-pressing die 5 (see FIG. 1), as a configurational element of the die-pressing die set 1 (see FIG. 1). Hereinafter, among configurations of the die-pressing die 71, only configurations different from those of the die-pressing die 5 will be explained. Note that, among configurations of the die-pressing die 71, configurational elements associating with those of the die-pressing die 5 are labelled with identical reference numbers thereof in the drawings.

As shown in FIG. 13, the discharge hole 41 is connectable to an air suction source 75 such as a vacuum pump via a dust collection box 73 disposed beneath the lower turret 11 or the like. In other words, the inside of the discharge hole 41 is configured to be turned into a negative pressure state (depressurized state) by driving the air suction source 75. Along with this, the circumferential groove 59 (see FIG. 1) and the supply passages 65 (see FIG. 1) are omitted from the die body 37.

Therefore, during die-pressing such as beveling of the workpiece W, the plural collection passages 69 suction air by driving the air suction source 75 to turn the inside of the discharge hole 41 into the negative pressure state. Then, similar to the specific actions of the die-pressing die 5, the dusts G such as iron powders attaching to the upper face of the die body 37 are sent to a side of the discharge hole 41 through the plural collection passages 69 and thereby discharged from the discharge hole 41 to the outside through the bottom hole 43 of the die holder 13 and the penetrating hole 45 of the lower turret 11. By this, it becomes possible to sufficiently restrict the dusts G from staying around the lower free ball bearing 49 on the upper face of the die body 37.

Therefore, also in the other embodiment of the present invention, effects equivalent to those of the embodiment according to the present invention can be brought.

Note that the present invention is not limited to the embodiment and the other embodiment explained above, and can be carried out in various embodiments as explained below.

Instead of the upper free ball bearing 25, another upper roller unit (not shown in the drawings) having an upper roller (not shown in the drawings) rotatable about a horizontal or vertical rotational axis. In this case, instead of the lower free ball bearing 49, another lower roller unit (not shown in the drawings) having a lower roller (not shown in the drawings) rotatable about a horizontal or vertical rotational axis is used.

In addition, a claimed scope contained in the present invention is not limited to the above-explained embodiments.

The invention claimed is:

1. A die-pressing die used for die-pressing a workpiece, the die-pressing die comprising:
   a die body on whose upper face a die hole is formed and on whose bottom face a discharge hole for discharging dusts is formed; and
   a roller unit disposed within the die hole and having a rotatable roller protruding upward from the upper face of the die body, wherein
   a depressed storage portion for storing the dusts is formed at a peripheral edge portion of the die hole on the upper face of the die body,
   a collection passage for collecting the dusts is formed at the peripheral edge portion of the die hole,
   one end of the collection passage is opened at the upper face of the die body,
   another end of the collection passage is opened to the discharge hole, and the collection passage is configured to suction air due to a negative pressure state in the discharge hole.

2. A die-pressing die used for die-pressing a workpiece, the die-pressing die comprising:

a die body on whose upper face a die hole is formed and on whose bottom face a discharge hole for discharging dusts is formed; and a roller unit disposed within the die hole and having a rotatable roller protruding upward from the upper face of the die body, wherein a collection passage for collecting the dusts is formed at the peripheral edge portion of the die hole, one end of the collection passage is opened at the upper face of the die body, another end of the collection passage is opened to the discharge hole, the collection passage faces to part of an outer circumferential surface of the roller unit from an upper end thereof to a lower end thereof, and the collection passage is configured to suction air due to a negative pressure state in the discharge hole.

3. The die-pressing die according to claim 1, wherein a circumferential groove is formed on an outer circumferential surface of the die body, a supply passage for supplying air into an inside of the die body is formed, one end of the supply passage is opened to the circumferential groove, another end of the supply passage is opened to the discharge hole, and an inside of the discharge hole is configured to be turned into the negative pressure state when air is supplied to the supply passage.

4. The die-pressing die according to claim 1, wherein the roller unit is detachable with respect to the die body.

5. The die-pressing die according to claim 1, wherein the roller is a ball roller, and the roller unit is a free ball bearing.

6. The die-pressing die according to claim 2, wherein a circumferential groove is formed on an outer circumferential surface of the die body, a supply passage for supplying air into an inside of the die body is formed, one end of the supply passage is opened to the circumferential groove, another end of the supply passage is opened to the discharge hole, and an inside of the discharge hole is configured to be turned into the negative pressure state when air is supplied to the supply passage.

7. The die-pressing die according to claim 2, wherein the roller unit is detachable with respect to the die body.

8. The die-pressing die according to claim 2, wherein the roller is a ball roller, and the roller unit is a free ball bearing.

* * * * *